(12) United States Patent
Walker et al.

(10) Patent No.: US 7,832,343 B2
(45) Date of Patent: *Nov. 16, 2010

(54) PYROLYZER WITH DUAL PROCESSING SHAFTS

(75) Inventors: William Walker, Huntington Beach, CA (US); Karen Meyer Bertram, Huntington Beach, CA (US)

(73) Assignee: International Environmental Solutions Corporation, Romoland, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/862,355

(22) Filed: Sep. 27, 2007

(65) Prior Publication Data
US 2008/0053347 A1 Mar. 6, 2008

Related U.S. Application Data

(63) Continuation-in-part of application No. 10/517,023, filed as application No. PCT/US02/20362 on Jun. 26, 2002.

(51) Int. Cl.
*F23G 5/027* (2006.01)
(52) U.S. Cl. ......................... 110/229; 110/257; 110/110
(58) Field of Classification Search ............... 110/257, 110/110, 229, 233, 255, 101 R, 267, 276; 198/625, 657; 414/158, 190; 202/139, 118, 202/100; 165/182
See application file for complete search history.

(56) References Cited

U.S. PATENT DOCUMENTS

| | | | | |
|---|---|---|---|---|
| 1,413,801 A * | 4/1922 | Smith | ........................ | 202/139 |
| 1,454,338 A * | 5/1923 | Richardson | ................. | 202/118 |
| 2,917,284 A | 12/1959 | Christian | | |
| 3,020,212 A * | 2/1962 | Lantz | ......................... | 202/118 |
| 3,706,445 A * | 12/1972 | Gentry | ........................ | 432/72 |
| 3,794,565 A * | 2/1974 | Bielski et al. | ............... | 202/100 |
| 4,452,611 A * | 6/1984 | Richey | ....................... | 110/255 |
| 4,759,300 A * | 7/1988 | Hansen et al. | .............. | 110/257 |
| 5,178,077 A | 1/1993 | Norris et al. | | |
| 5,220,873 A | 6/1993 | Milsap, III | | |
| 5,335,607 A * | 8/1994 | Wilcox | ....................... | 110/233 |
| 5,846,072 A * | 12/1998 | Willis | ......................... | 110/257 |
| 5,927,216 A * | 7/1999 | Oga | ........................... | 110/258 |
| 6,357,577 B1 * | 3/2002 | Bruke | ......................... | 198/625 |

(Continued)

FOREIGN PATENT DOCUMENTS

JP 10-153747 6/1998

(Continued)

*Primary Examiner*—Kenneth B Rinehart
*Assistant Examiner*—David J Laux
(74) *Attorney, Agent, or Firm*—Fish & Associates, PC

(57) ABSTRACT

A pyrolyzer has a heated inner housing that includes first and second conveyors. Preferred conveyors have independent or at least potentially independent flows of material to be pyrolyzed. All suitable conveyors are contemplated, including especially screw conveyors, or combination of screw and paddle conveyors. Both first and second conveyors can be disposed within a common lumen, with a partial divider between them. An alternative divider is also contemplated that more or less divides the inner housing into two lumens. Thus, the lumens can be entirely distinct, or can have cross-flow of gases and/or material being pyrolyzed. Heat transfer fins can be advantageously attached, extend from, or be otherwise coupled to the inner housing to assist in transfer of heat into the lumen(s) of the inner housing.

10 Claims, 16 Drawing Sheets

U.S. PATENT DOCUMENTS

| | | | |
|---|---|---|---|
| 6,619,214 B2 * | 9/2003 | Walker | 110/233 |
| 6,758,150 B2 | 7/2004 | Ballantine et al. | |
| 7,182,028 B1 | 2/2007 | White | |
| 2006/0124040 A1 | 6/2006 | Walker | |

FOREIGN PATENT DOCUMENTS

| | | |
|---|---|---|
| JP | 2000-016455 | 1/2000 |
| JP | 2002-064075 | 2/2002 |

* cited by examiner

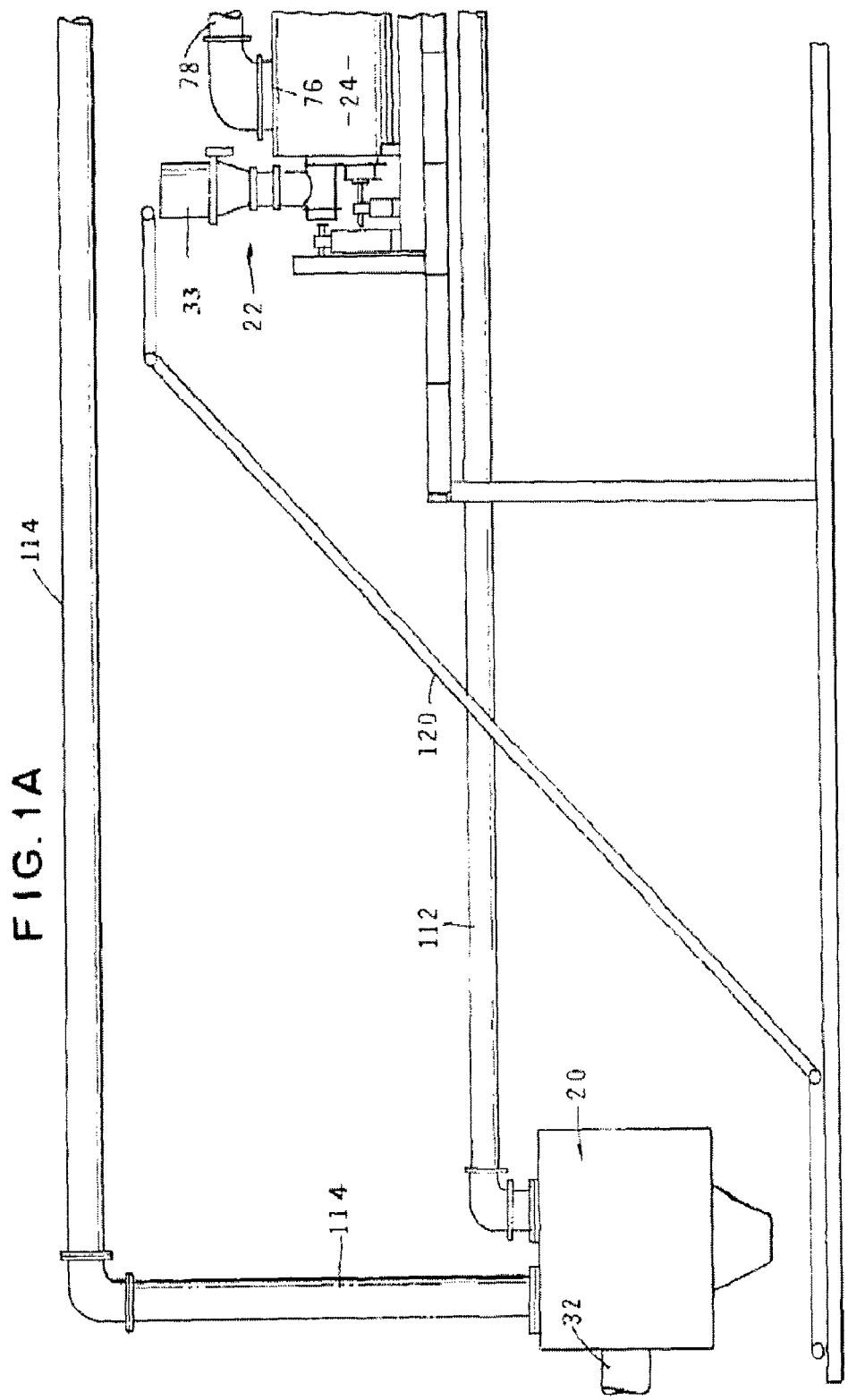

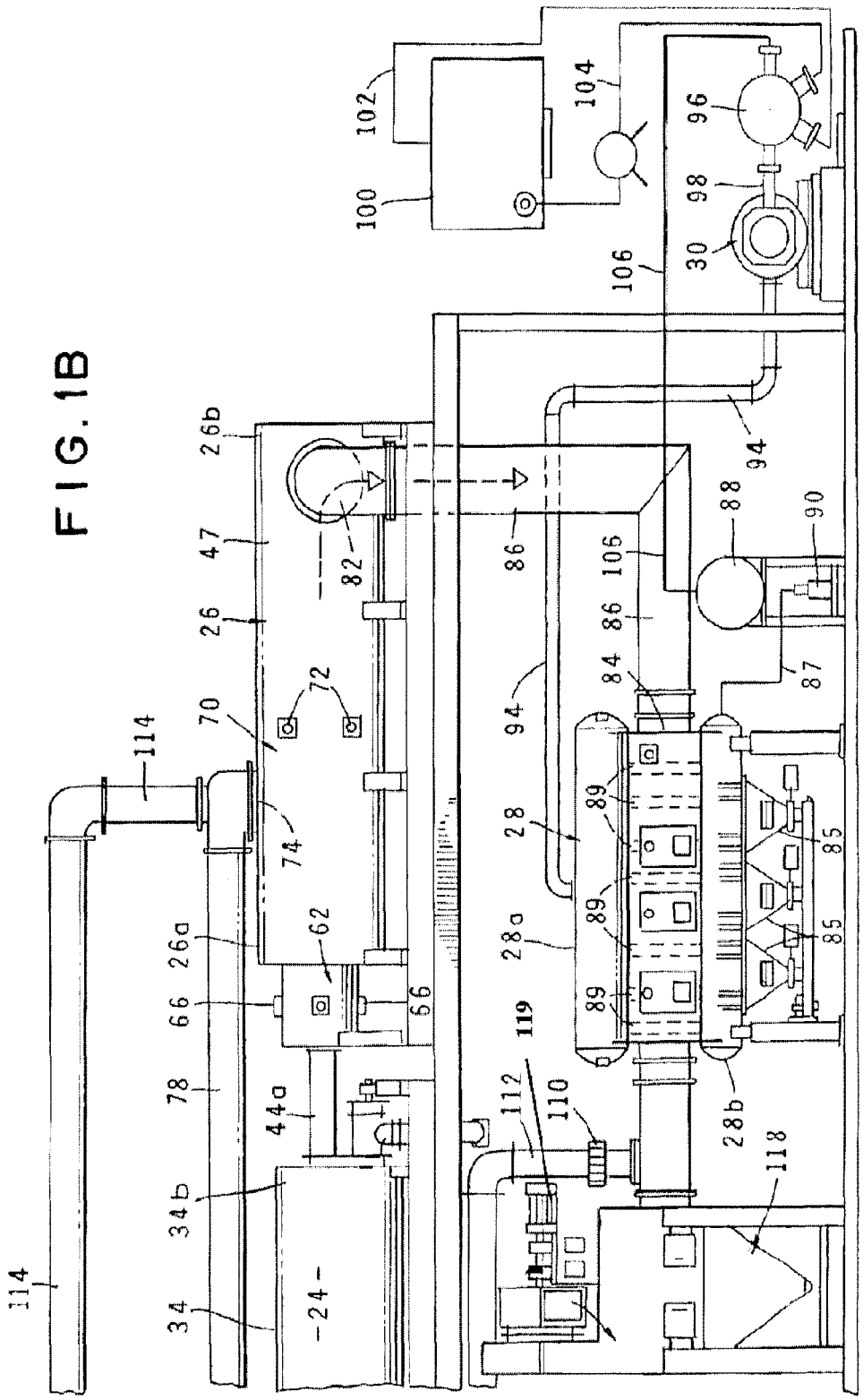

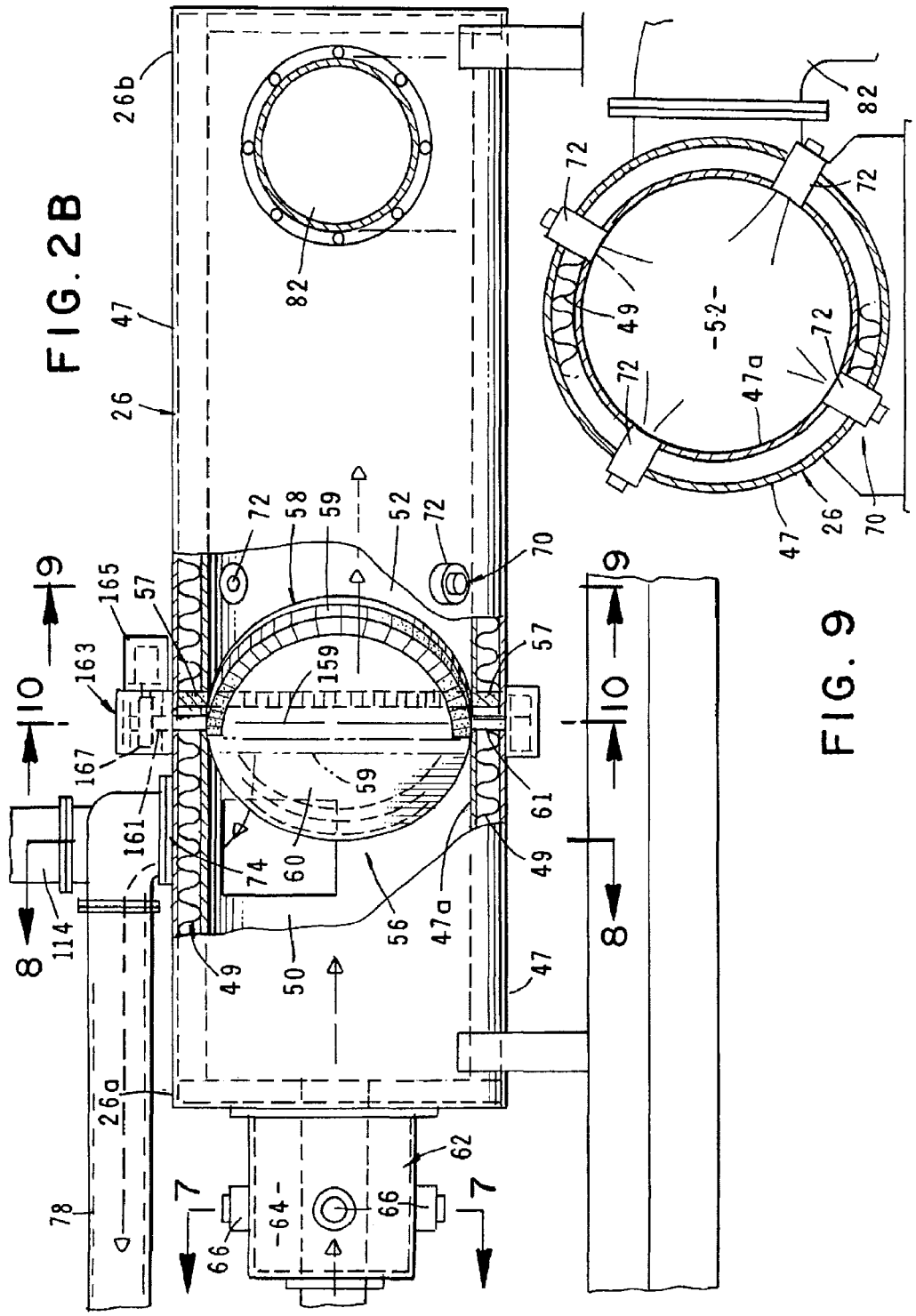

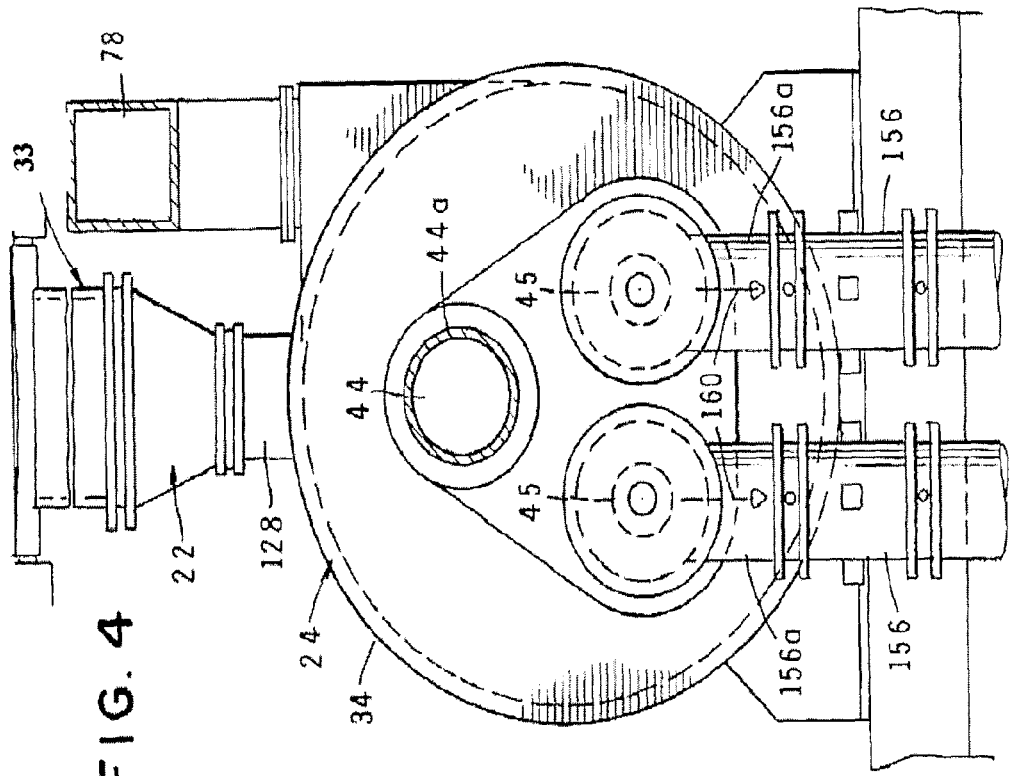
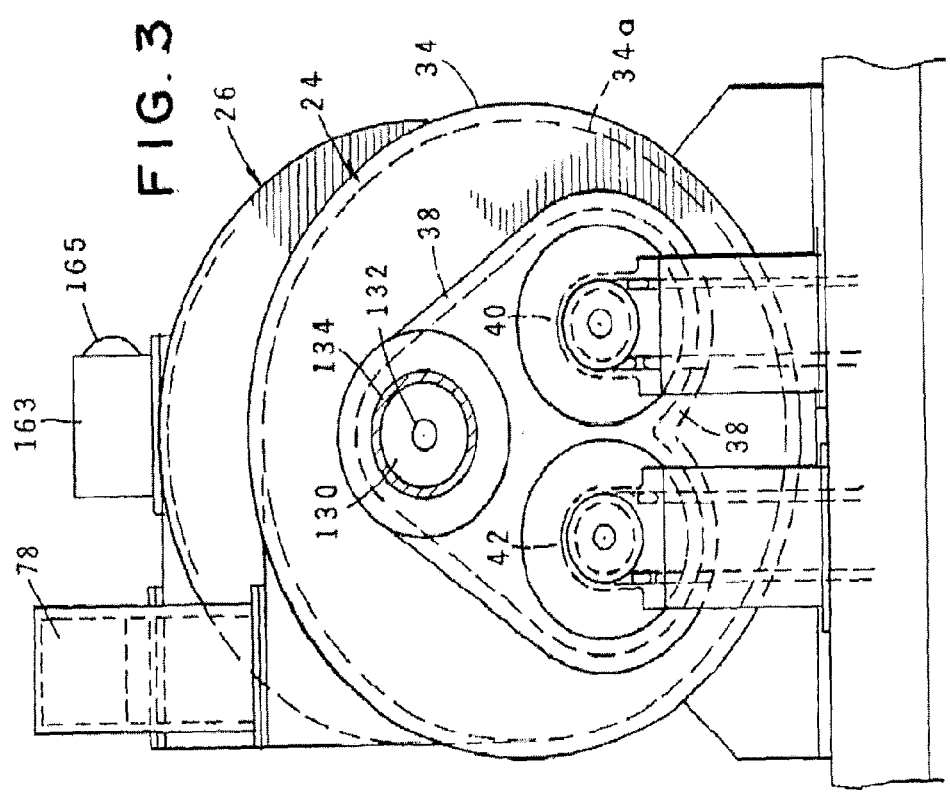

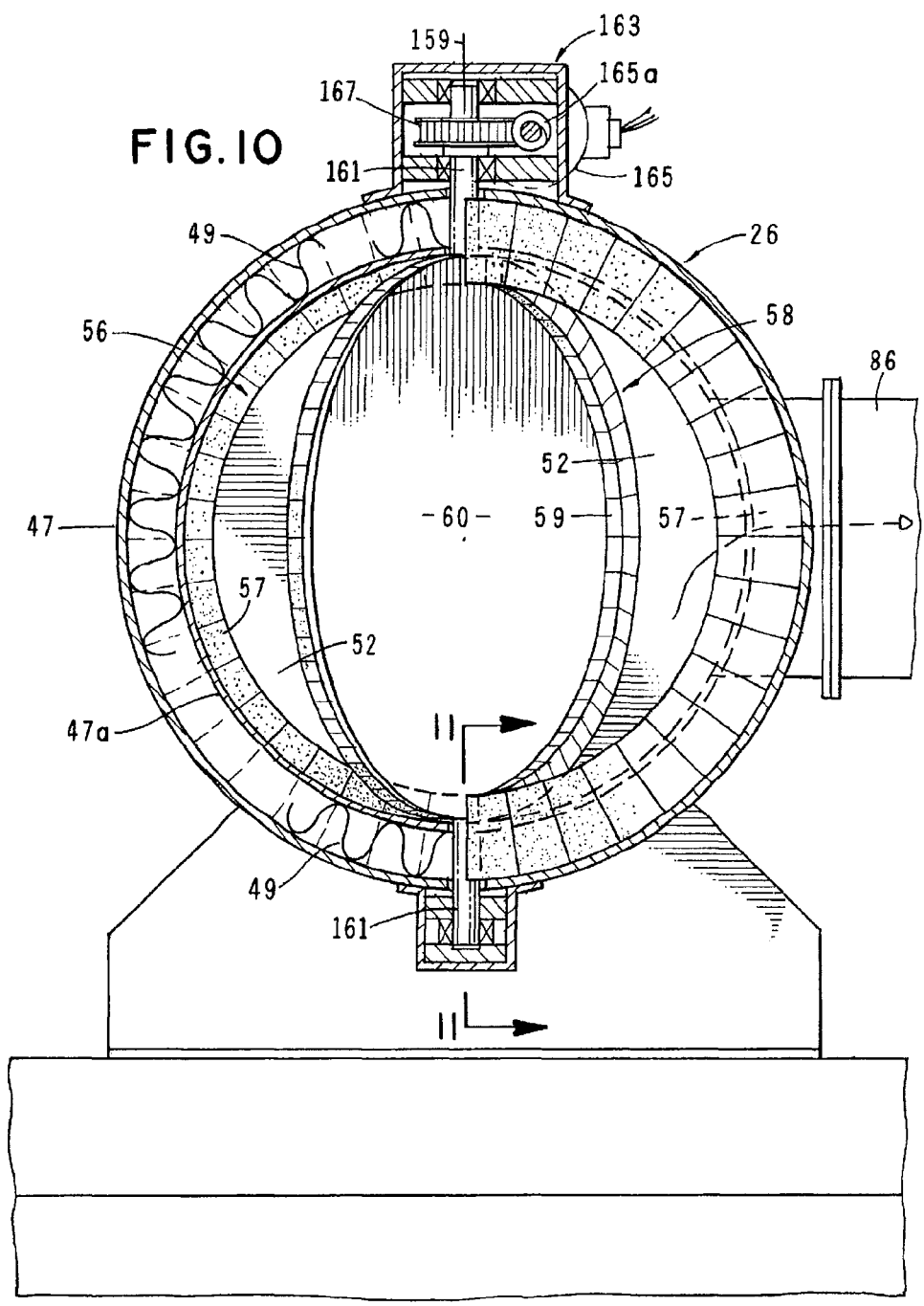

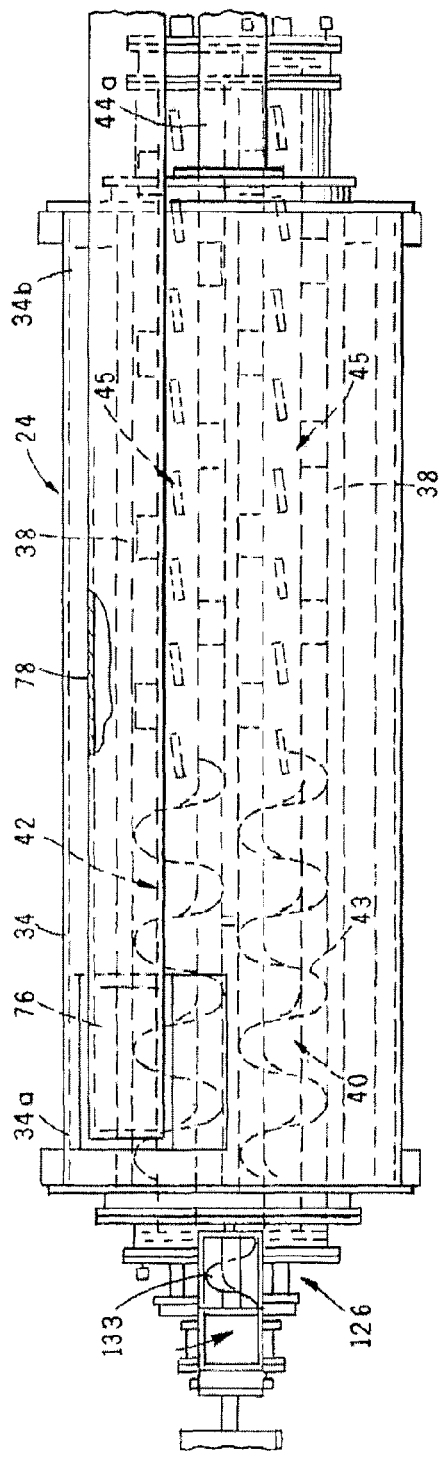
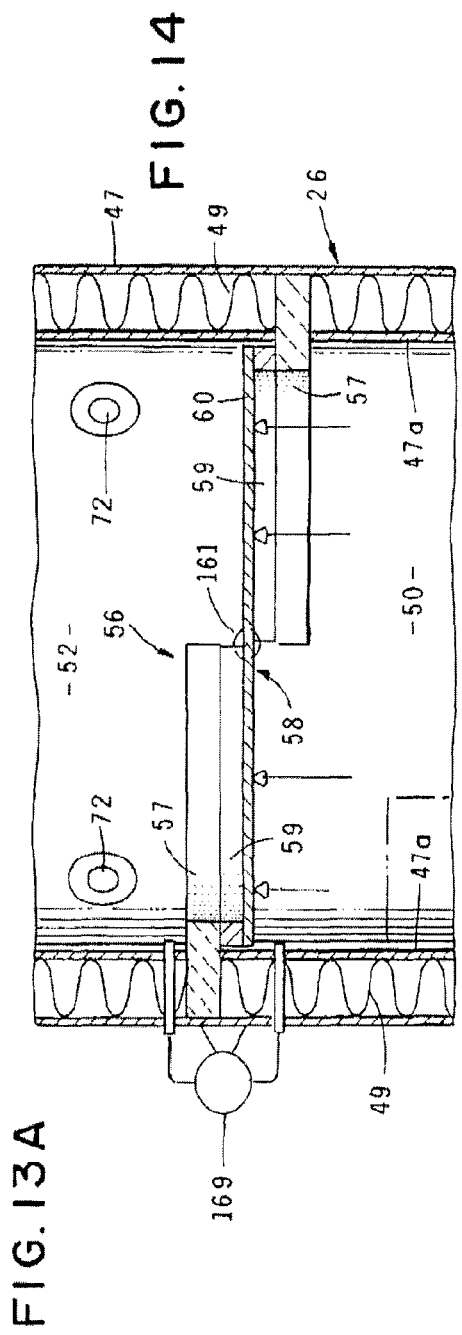

PYROLYZER WITH DUAL PROCESSING SHAFTS

This application is a continuation-in-part of U.S. Ser. No. 10/517,023 filed Oct. 24, 2005, which is a national phase filing of PCT/US02/20362 filed Jun. 26, 2002.

FIELD OF THE INVENTION

The field of the invention is pyrolysis (US 110/229, Int Cl. F23G 5/12).

BACKGROUND

Pyrolysis employs high temperatures in a relatively oxygen free environment to remove volatiles, as well as gases that can be released at high temperature from breaking down a feedstock. Depending on the feedstock, the volatiles can then be burned to produce usable energy.

It is known to pyrolyze trash, old tires, and other municipal wastes. A typical waste treatment system utilizing pyrolysis includes an input structure for introducing the waste; a chamber or retort from which air can be restricted, and some sort of conveyor mechanism for moving the waste through the system. A dual housing is commonly used, in which the conveyor mechanism conveys the waste through the inner housing, heated gas (exhaust) is introduced into the space between the housings, and heat is conducted to the waste through the walls of the inner housing.

U.S. Pat. No. 5,178,077 to Norris et al. (January 1993) teaches use of dual parallel screws for removing volatiles from soil. Norris, however, contemplates temperatures of only 800° C., and therefore fails to teach the use of dual conveyors in the context of pyrolysis. Indeed, the temperatures of Norris are sufficiently low that there is no need for inner and outer housings, and apparatus or methods for efficiently transferring heat into an inner housing.

U.S. Pat. No. 6,758,150 to Ballantine et al. (July 2004) teaches use of dual screws to transport waste in a pyrolyzer operation, but the screws are not operated in parallel. One of the screws is outside the pyrolyzer. U.S. Pat. No. 4,759,300 to Hansen et al. (July 1988) teaches a dual screw for conveying waste. In that case, both screw conveyors are disposed within the pyrolyzer, but the screws are still not operated in parallel. The output of one screw conveyor provides partially pyrolyzed material input to the other screw. U.S. Pat. No. 7,182,028 to White (February 2007) also teaches dual conveyers (although not a screw conveyor) disposed within a pyrolyzer, but there again the output of one conveyor provides partially pyrolyzed material input to the other conveyor.

Norris, Ballantine, Hansen, White, and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply Thus, there is still a need for a pyrolyzer with dual processing shafts, and for more efficient transfer of heat through the wall of the inner housing.

SUMMARY OF THE INVENTION

The present invention provides apparatus, systems and methods in a pyrolyzer has a heated inner housing that includes first and second conveyors.

Preferred conveyors have independent or at least potentially independent flows of material to be pyrolyzed. All suitable conveyors are contemplated, including especially screw conveyors, or combination of screw and paddle conveyors.

Both first and second conveyors can be disposed within a common lumen, with a partial divider between them. Such a divider can be continuous with the inner housing such that the inner housing and divider comprise a generally inverted heart shape. A particular advantage of that design is that the divider can be sufficiently large to provide substantial structural support to the pyrolyzer.

An alternative divider is also contemplated that more or less divides the inner housing into two lumens. Thus, the lumens can be entirely distinct, or can have cross-flow of gases and/or material being pyrolyzed.

Heat transfer fins can be advantageously attached, extend from, or be otherwise coupled to the inner housing to assist in transfer of heat into the lumen(s) of the inner housing. Both internally and externally projecting fins are contemplated. Fins 222, 224 can have any suitable number, dimensions, and orientations, including especially a number of six to ten, a thickness of 2 to 4 cm, a height of 5 to 10 cm, and a length of 10 cm to several meters. Fins are preferably parallel to one another, and parallel to the long axis of the inner housing 220, but alternative fins 222, 224 could have any other suitable orientation, and for example could be co-linear or non-linear. Fins 222, 224 can be separated by any suitable distance, which would typically be between 20 cm and 1 meter. Unless a contrary meaning is apparent from the context, all ranges described here are inclusive of their endpoints.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWING

FIGS. 1A and 1B, when considered together, comprise a side-elevational view of one form of the apparatus of the invention.

FIGS. 2A and 2B, when considered together, comprise an enlarged, side elevational view of the thermo converter and thermo oxidizer components of the apparatus partly broken away to show internal construction.

FIG. 3 is an enlarged, cross-sectional view taken along the lines 3-3 of FIG. 2A.

FIG. 4 is an enlarged, cross-sectional view taken along lines 4-4 of FIG. 2A.

FIG. 9 is a cross-sectional view taken along lines 9-9 of FIG. 2B.

FIG. 10 is an enlarged, cross-sectional view taken along lines 10-10 of FIG. 2B.

FIGS. 13A and 13B, when considered together, comprise a top plan view of components shown in FIGS. 2A and 2B.

FIG. 14 is an enlarged, fragmentary view of a portion of the thermo oxidizer component showing the barrier ring in a closed position.

DETAILED DESCRIPTION

Figure 1C:
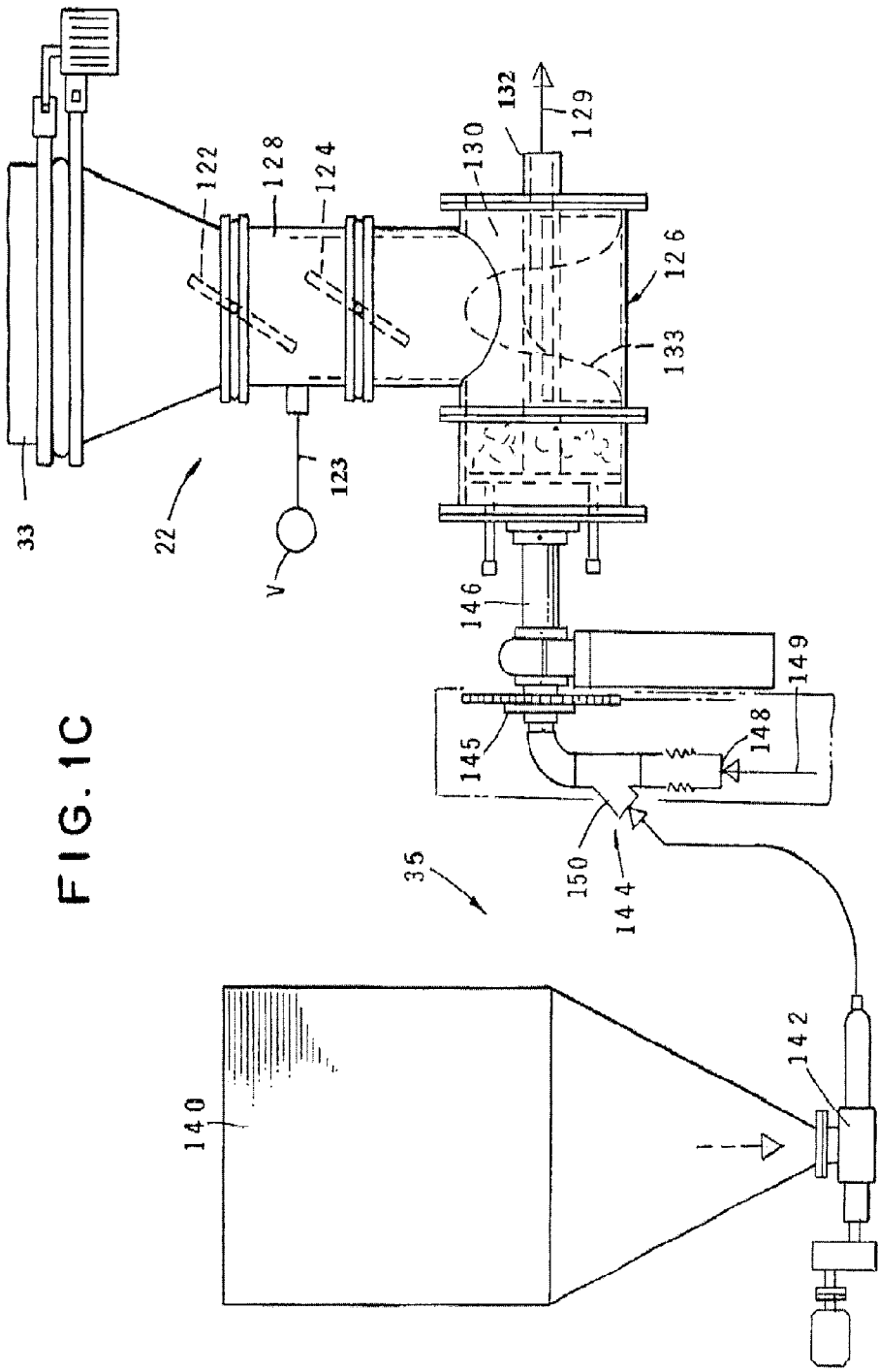
FIG. 1C is an enlarged, side-elevational view of the feed means of the invention.

Referring to the drawings and particularly to FIGS. 1A and 1B, one form of the apparatus of the invention is there shown. The apparatus here comprises seven major cooperating subsystems, namely a dryer 20, a feed means 22, a thermal chemical reactor or pyrolytic converter 24, a two-stage, thermal oxidizer 26, a steam generator 28, and a steam turbine 30 that is driven by the steam converted by the steam generator.

In the operation of the apparatus of the invention, the waste material to be treated is first introduced into the dryer subsystem 20 via an inlet 32. After drying in a manner presently to be described, the dried waste material is controllably fed into the thermal reactor 24 by the novel feed means 22 which uniquely includes both a solid feed means and a liquid feed means. The solid feed means for feeding solid waste material to the converter comprises a gravity fed, bottom surge feed hopper 33 of the, general construction shown in FIG. 1C. As will be described more fully hereinafter, the liquid waste materials can be introduced into the pyrolytic converter simultaneously with the introduction of solid materials via the liquid feed means that is generally designated in FIG. 1C by the numeral 35. This novel liquid feed means includes an atomizer means for at least partially atomizing the liquid waste.

Figure 2A:
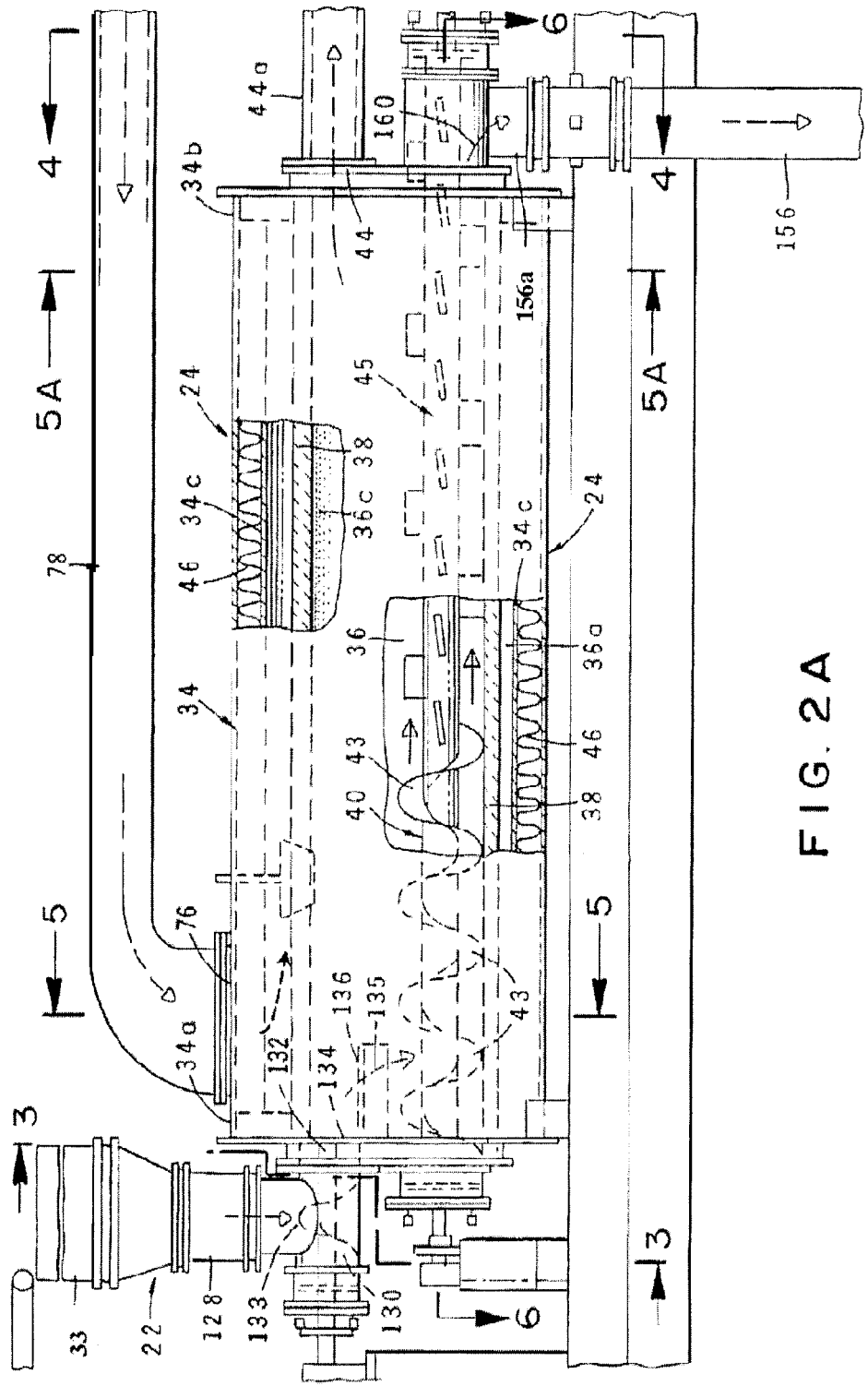
Figure 5:
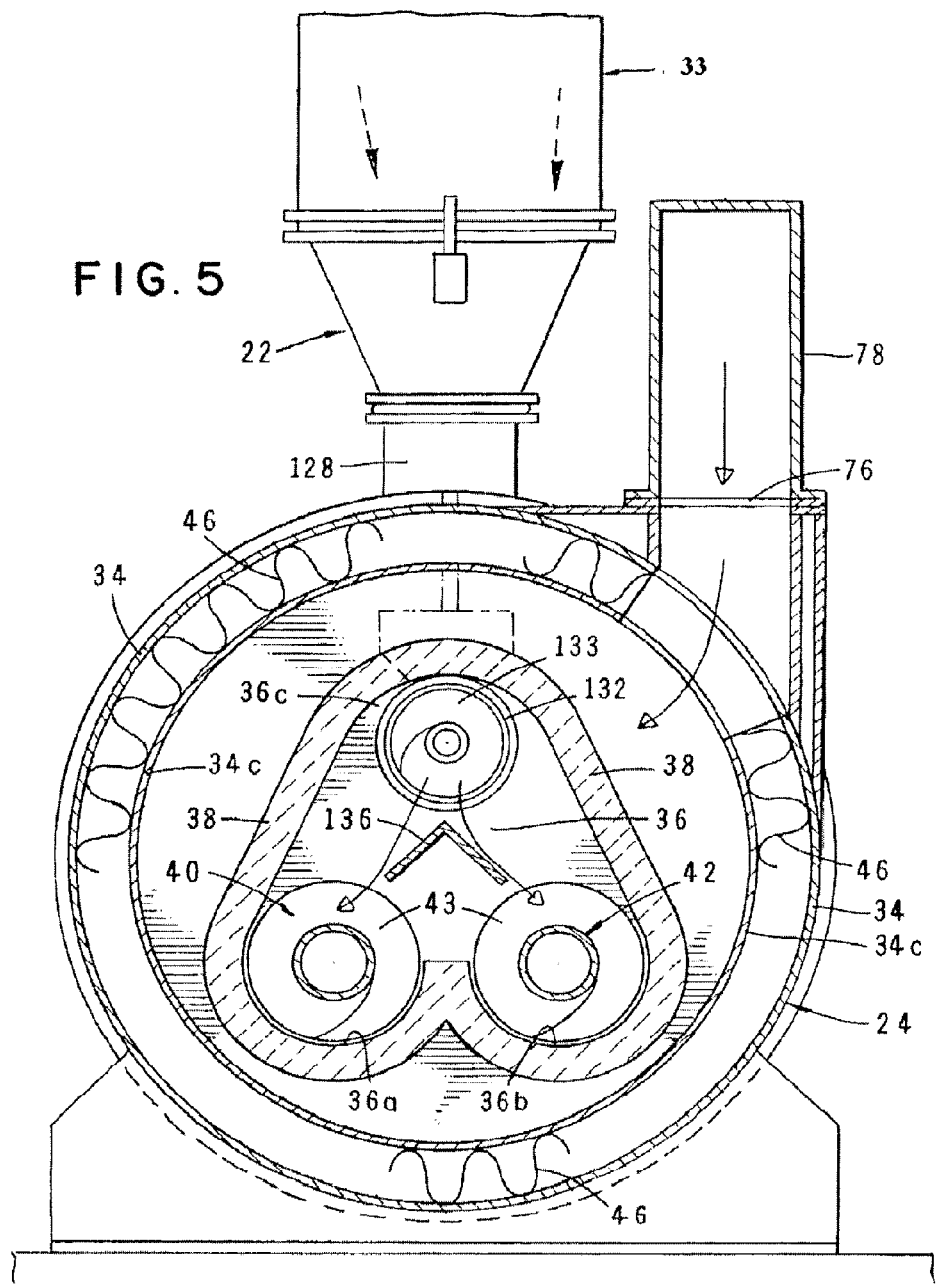
FIG. 5 is a greatly enlarged, cross-sectional view taken along lines 5-5 of FIG. 2A.
Figure 5A:
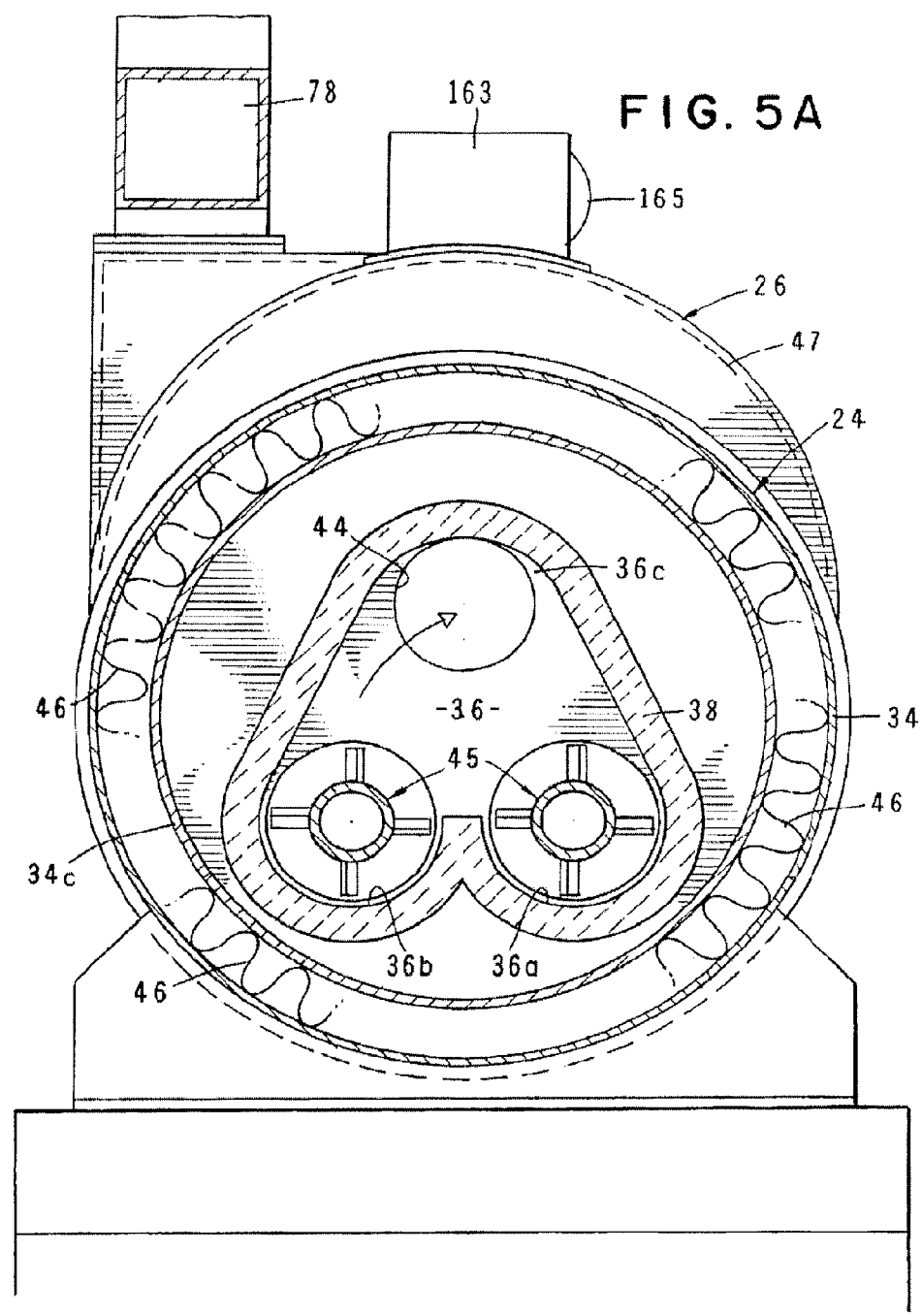
FIG. 5A is a greatly enlarged, cross-sectional view taken along lines 5 5A of FIG. 2A

As illustrated in FIGS. 2A, and 5, the novel thermal reactor or pyrolytic converter subsystem 24 of the present form of the invention is of a unique configuration that comprises a hollow housing 34 having first and second ends 34a and 34b. Disposed within housing 34 is a reaction chamber 36 that is defined by an elongated hollow structure 38 that in cross section has a novel three dome, generally triangular configuration (FIG. 5). Structure 38 is preferably constructed from a castable refractory material capable of withstanding temperatures in excess of 3200 degrees Fahrenheit. As shown in FIG. 5, chamber 36 includes first and second longitudinally extending, semicircular shaped, subchambers 36a and 36b. Extending longitudinally of chamber 36a is a first conveyor means, or conveyor mechanism 40. Extending longitudinally of chamber 36b is a similarly configured second conveyor means or conveyor mechanism 42. These conveyor mechanisms 40 and 42 are of a novel construction with each comprising a first helical screw section 43 for conveying less pyrolyzed and, therefore, more dense waste and a second paddle like section 45 for conveying the more pyrolyzed, less dense waste (see FIGS. 5 and 5A). The twin conveyor mechanisms are mounted within the reactor using conventional bearings 41 and are controllably rotated by conventional drive means 41a of the chamber shown in FIG. 6.

The upper portion 36c of reaction chamber 36 functions to permit generated gases within the chamber to expand and, in a manner presently to be described, to be transported from the reaction chamber via a chamber outlet 44 (FIG. 2A). As illustrated in FIGS. 2A and 5, the inner surfaces 34c of the hollow housing 34 within which the reactor chamber is mounted, are covered by a ceramic fiber insulation 46 that is connected to the inner walls of the housing by suitable fasteners. As will presently to be described, the area between the inner surfaces 34c of the housing and the ceramic reaction chamber 38, is initially controllably heated by the first stage of the thermal oxidizer 26.

Figure 12:
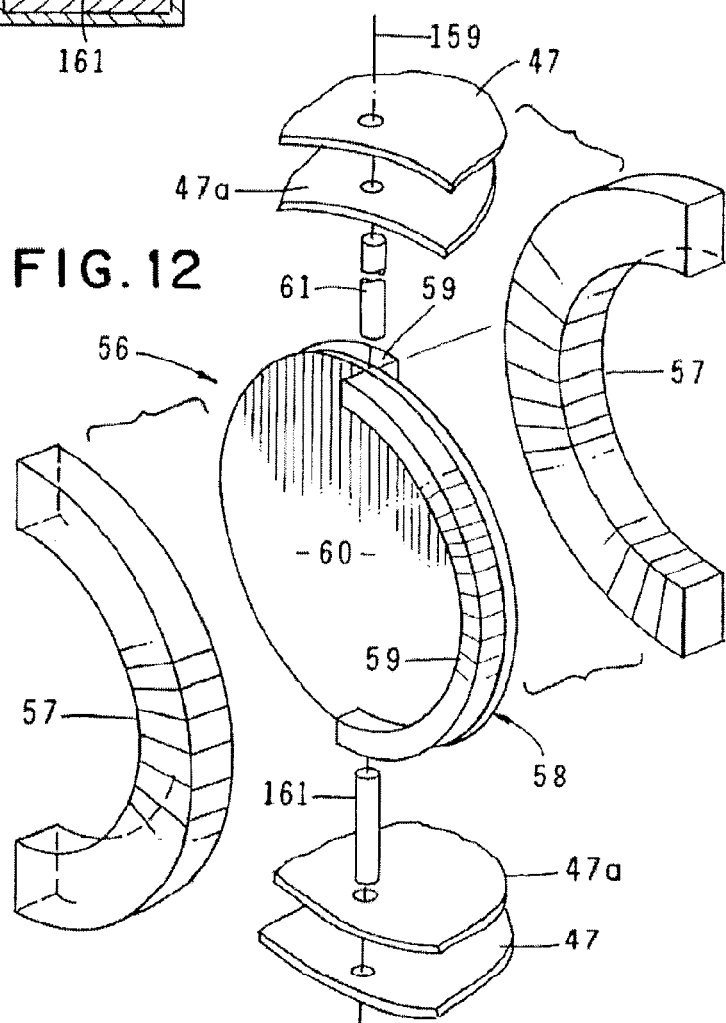
FIG. 12 is a generally perspective, exploded view of one form of barrier ring assembly of the thermo oxidizer.
Figure 13B:
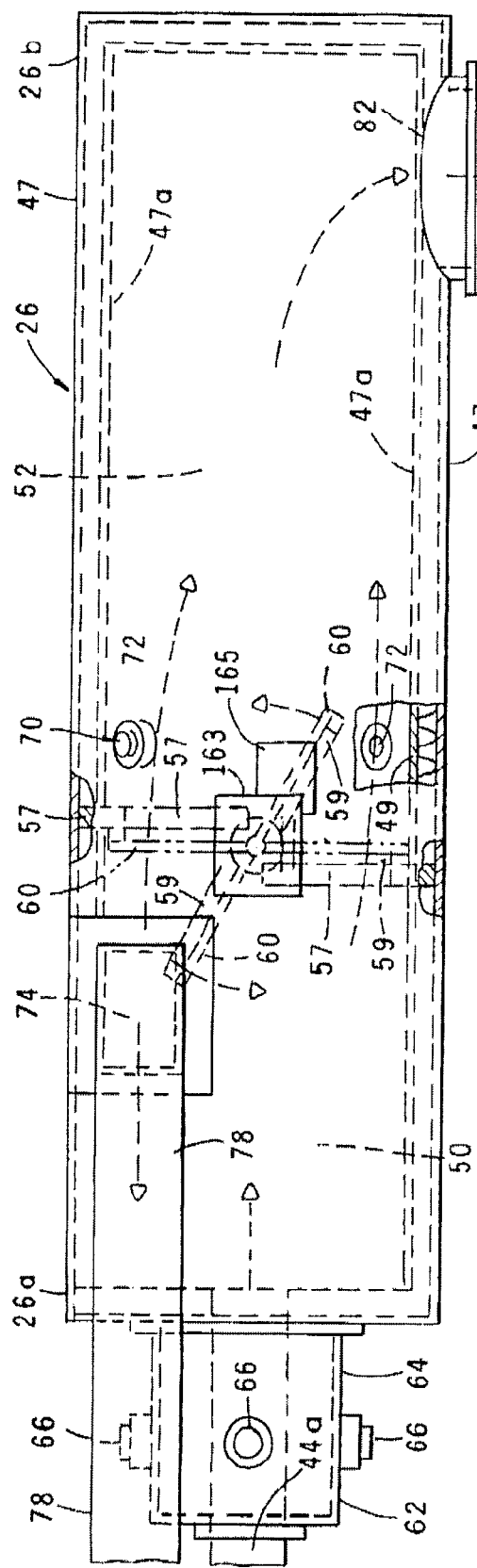
Figure 15:
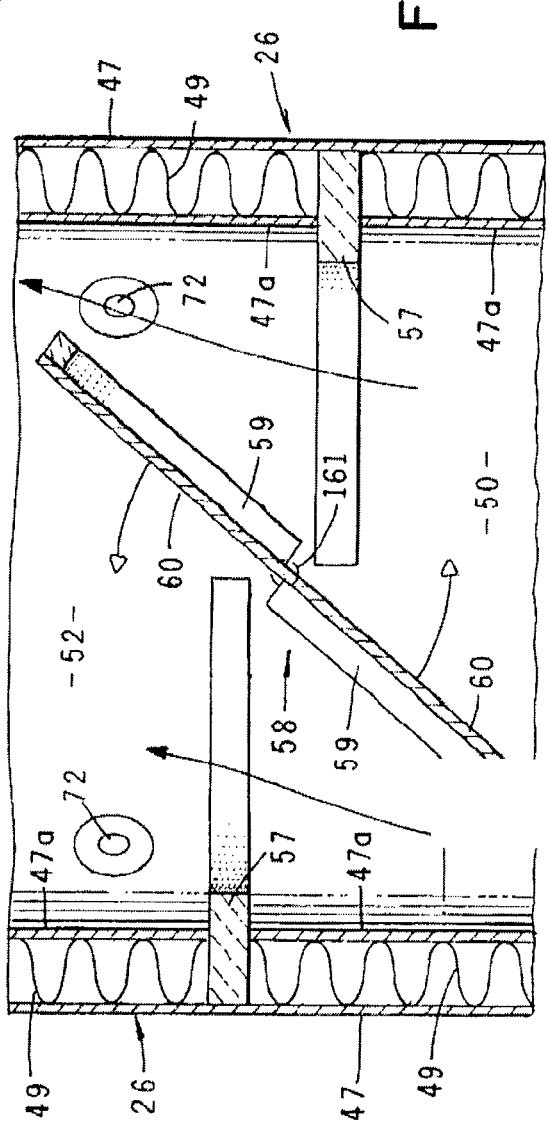
FIG. 15 is a fragmentary view similar to FIG. 14 but showing the barrier ring in an open position.

Turning particularly to FIGS. 2B, and 13B the thermal oxidizer 26, of the present form of the invention, includes a hollow housing 47 having an inner wall 47a. Disposed between the inner and outer wall is a ceramic fiber insulation 49. Within housing 47 is a first stage defined by a first subchamber 50 and a second stage defined by a second subchamber 52. Dividing subchambers 50 and 52 is a novel baffle means for controlling the flow of gases between the chambers. This baffle means here comprises a novel barrier ring assembly 56 that comprises a pair of fixedly mounted semicircular segments 57 (FIGS. 10, 12, 13B, and 15) and a pivotally mounted assembly 58. Assembly 58 is made up of a pair of semicircular segments 59 that are affixed to a ceramic baffle plate 60 (see FIGS. 10, 12, 13B, and 15). As illustrated in FIGS. 12, 13B and 15, the baffle ring assembly 56 is movable between the first and second positions illustrated by the solid and phantom lines in FIG. 13B. Thermal oxidizer 26 is also is also capable of withstanding temperatures in excess of 3000 degrees Fahrenheit.

Figure 7:
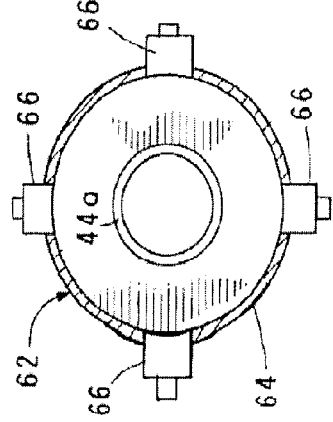
FIG. 7 is a cross-sectional view taken along lines 7-7 of FIG. 2B.

Thermal oxidizer 26 further includes a first stage heater means for controllably heating subchamber 50 and second stage heater means for controllably heating subchamber 52. In the present form of the invention, the first stage heater means comprises a first burner assembly 62 that includes a generally cylindrically shaped housing 64 (FIG. 7) that is connected to the first end 26a of thermal oxidizer 26 in the manner best seen in FIG. 2B. Housing 64 carries four circumferentially spaced gas burners 66 that are of conventional construction and function to initially heat subchamber 50 at time of startup. Similarly, the second stage heater means here comprises a second burner assembly 70 that is mounted in housing 47 intermediate subchambers 50 and 52 in the manner shown in FIG. 2B. As best seen in FIG. 9, second burner assembly 70 comprises four circumferentially spaced gas burners 72 that are also of conventional construction and function to initially heat second subchamber 52 at the time of startup. Burners 66 and 72 are of a conventional construction and are commercially available from sources such as Eclipse Combustion, Inc. of Rockford, Ill., U.S.A.

First subchamber 50 has an outlet port 74 that is in communication with a port 76 formed in reactor 24 via a conduit 78 (FIGS. 1A and 1B). In a manner presently to be described, reaction chamber 36, which preferably operates at less than five percent (5%) oxygen is initially heated in a flame-free manner by heated gases transferred from subchambers 50 and 52 of the thermal oxidizer to the area between the inner surfaces 34c of the housing 34 and the ceramic reaction chamber 38.

Second subchamber 52 of the thermal oxidizer has an outlet port 82 that communicates with an inlet port 84 of the steam generator subsystem 28 via a conduit 86. Steam generator subsystem 28, which includes a high pressure steam tank 28a and a lower mud drum 28b, is of a conventional design and is readily commercially available from various sources as, for example, Babcock Wilcox of Mississippi. Drum 28b is provided with a plurality of cleanout assemblies 85 for periodically removing sludge and the like from the drum. As shown in FIG. 1B, drum 28b is interconnected with tank 28a by a plurality of spaced-apart, connector tubes 89 and is also connected with a water supply here provided in the form of make-up water tank 88. The water contained within tank 88 is pumped to drum 28b via conduit 87 by a conventional pumping system 90 (FIG. 1B) and is converted to high-pressure steam within the connector tubes 89 which are impinged upon by the heated gases transferred from the thermal oxidizer 26 to the steam generator via conduit 86.

In system operation, the high pressure steam contained within tank 28a is transferred to steam turbine 30 via a conduit 94. Steam turbine 30, which is of conventional construction and is also readily commercially available from sources such as De Mag La-Vale, generates electricity that may be used to power the various electrically driven components of the apparatus, such as the pumping system 90. The steam exhausted from steam turbine 30 is carried to a conventional condenser 96 via a conduit 98. The water formed in condenser 96 is then transferred to a cooling tower 100, which is also of conventional construction, via a conduit 102. The water that has been cooled within the cooling tower 100 is returned to condenser 96 via a conduit 104 and is then transferred to tank 88 via a conduit 106 (FIG. 1B).

As shown in FIGS. 1A and 1B, a portion of the waste gases flowing through steam generator 28 is first cooled with dilution air and is then transferred to the dryer subsystem 20 via a diverter valve 110 and a conduit 112. These hot waste gases at a temperature of about 550 degrees Fahrenheit are used to efficiently dry the waste contained within the dryer 20. From dryer 20 the gases are returned to the thermal oxidizer via an overhead conduit 114 (FIG. 1B). The portion of the gases from the steam generator that are not diverted to the dryer are transferred to a condensed scrubber apparatus 118 which effectively removes harmful contaminants from the exhaust gases so that the gases can be safely discharged to atmosphere via a conventional blower unit 119. Scrubber apparatus 118 is commercially available from various sources such as C. W. Cole Fabricators, Inc. of Long Beach, Calif. Similarly, blower unit 119 is readily available from sources such as New York Blowers Co. of Willow Brook, Ill.

In operating the apparatus of the invention, the baffle assembly 56 of the thermo oxidizer 26 is moved into a closed position wherein chamber 50 is substantially sealed relative to chamber 52. This done, burners 72 of burner assembly 70 are ignited to controllably heat chamber 52 to a temperature sufficient to cause the water contained within tubes 89 of the steam generator apparatus 28 to be converted into high-pressure steam. When tank 28 of the steam generating system is filled with pressurized steam, the steam can be conveyed to the turbine generator 30 via conduit 94. With the generator 30 in operation, sufficient electricity can be generated to operate the various electrical components of the apparatus including the pumping system 90 which is used to pump water to the make-up tank 88.

Once sufficient power is being generated by generator 30 to operate the electrical system, burners 66 of burner assembly 62 can be ignited in order to controllably heat chamber 50. When the gases within chamber 50 reach a temperature sufficient to pyrolyze the waste material that is contained within dryer 20, the material can be transferred to the feed means by transfer means shown here as a conventional waste conveyor 120. As previously mentioned, the material within dryer 20 is dried by the excess gases flowing from the thermal oxidizer through the steam generator and into conduit 112 via diverter valve 110. Once the gases within chamber 50 have reached the pyrolyzing temperature, they are transferred to the reactor chamber via conduit 78, to heat the reactor chamber to a pyrolyzing temperature. When this has been achieved, baffle assembly 56 can be moved into the open position shown in FIG. 2B and the feeding of the dried waste can begin.

As the waste material, being transferred to the hopper by waste conveyor 120, starts to flow into the hopper 33, the upper butterfly valve 122 of the hopper system is moved into the open position shown in FIG. 1C of the drawings and the lower butterfly valve 124 is moved into a closed position blocking any transfer of waste material from the hopper into the auger portion 126 of the feed assembly. Once intermediate chamber 128 of the feed assembly is filled with the waste to be pyrolyzed, a vacuum is drawn within chamber 128 by a vacuum pump "V" that is interconnected with chamber 128 by a conduit 123 (FIG. 1C). After chamber 128 has been suitably evacuated, butterfly 124 is moved into an open position permitting the waste contained within chamber 128 to flow into the auger conveyor means of the feed assembly without jeopardizing the integrity of the vacuum within the reactor chamber. As is indicated by the arrow 129 in FIG. 1C, the dried waste material entering the chamber 130 that contains the conveyor screw 133 is controllably fed into the reactor chamber via hollow shaft 132 and inlet 134 of the reactor chamber (FIG. 2A).

The waste material entering the, reactor chamber will fall downwardly in the direction of the arrow 135 of FIG. 2A in a direction toward the screw conveyors 43. As illustrated in FIG. 5, the waste material flowing into chamber 36 will impinge upon the elongated, angular shaped distribution member 136 that is disposed within chamber 36 (see also FIG. 2A). As the waste being introduced into the reactor impinges on diverter member 136, the waste will be directed toward the two twin conveyors 40 and 42 in the direction of the arrows of FIG. 5. It is to be understood that with the construction just described, waste materials can be controllably metered into the reactor chamber 36 and evenly distributed between the two screw conveyors 40 and 42.

The waste material introduced into chamber 36 in the manner just described will be carried forwardly of the reactor by the conveyor mechanisms 40 and 42 and, as it travels forwardly of the reactor will be undergo pyrolyziation due to the elevated temperature of the reactor chamber. By the time the waste material reaches the end of the screw conveyor, sections 43, it will have been substantially reduced to carbon form which is of a lesser density that will permit it to be transferred through the remaining length of the reactor chamber by the novel paddle conveyors 45 that are of a construction best seen in FIG. 5A.

Turning once again to FIG. 1C, it is to be noted that the apparatus of the invention further includes a fluid waste tank 140 that is adapted to store fluid waste as, for example, waste oil. Because of the novel construction of the feed means of the invention, the waste fluid can be disposed of simultaneously with the disposal of the solid waste. When it is desired to dispose of the fluid waste contained within tank 140, a conventional pumping means 142, which is shown here as a conventional, progressive, cavity, positive displacement pump 142, is used to transfer the fluid from vessel 140 to the atomizing means of the apparatus. This novel atomizing means here comprises the assembly generally designated in FIG. 1C by the numeral 144. In the present form of the invention, the atomizing means comprises a chicksan rotating joint 145 that permits the introduction of various carrier gases such as steam into the hollow shaft 146 of the feed means. The atomizing means further includes a steam inlet 148 through which steam at least 400 degrees Fahrenheit from steam generator 28 can be controllably introduced in the direction shown by the arrow 149 of FIG. 1C. Steam entering steam inlet 148 will create a venturi effect within a Y-fitting 150 that defines a venturi mixing chamber that is interconnected within a conduit 146 via the chicksan joint 145. The venturi effect created within fitting 150 will draw the fluid into the venturi chamber where it will be atomized in a manner well understood by those skilled in the art. The atomized fluid will then flow into the previously identified chamber 130 via hollow shaft 146. As the atomized fluid enters chamber 130, it will intermix with the waste material contained therein and will travel with the waste material into the reactor in the manner earlier described. It is, of course, apparent that the intermixture of the dried waste material and the atomized fluid will be readily pyrolyzed within the reactor as the material is carried forwardly of the reactor by the conveyor means of the invention.

Figure 6:
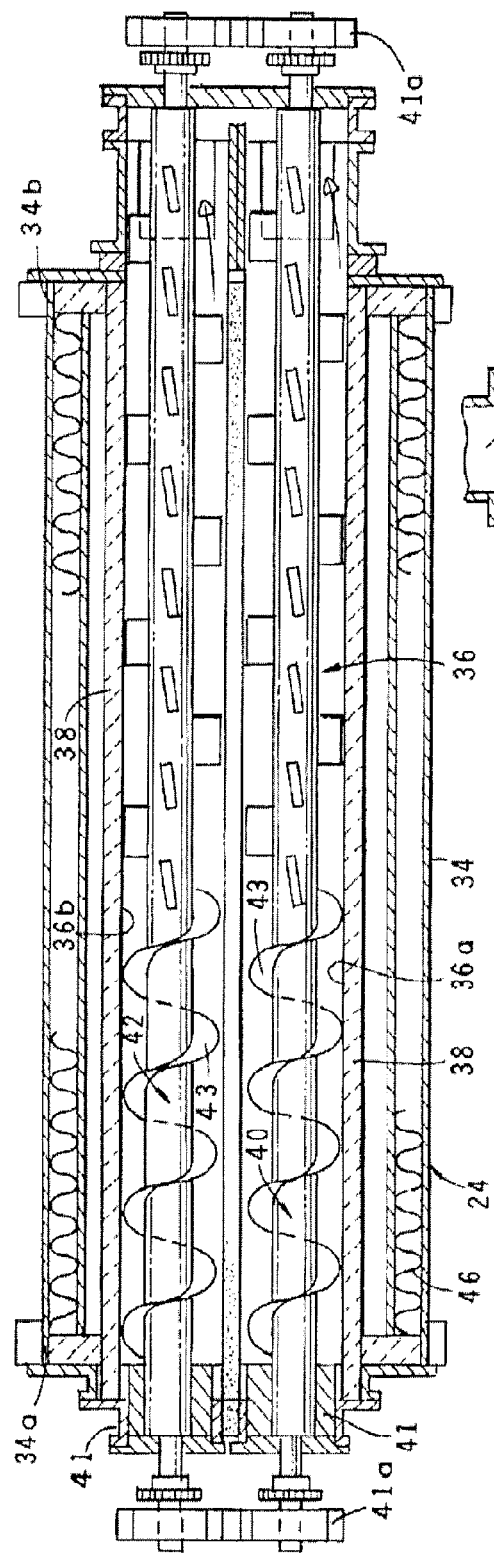
FIG. 6 is a cross-sectional view taken along lines 6-6 of FIG. 2A.
Figure 8:
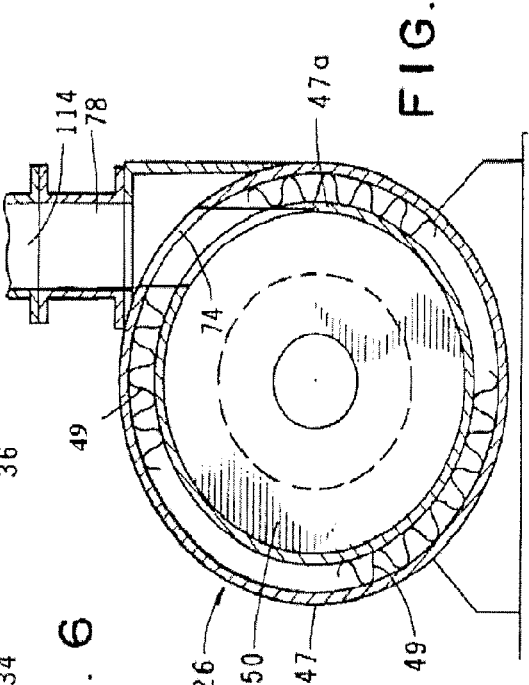
FIG. 8 is a cross-sectional view taken along lines 8-8 of FIG. 2B.

It is to be understood that the novel conveyor means of the invention that is mounted within the reactor chamber in the manner best seen in FIG. 6 is relatively light weight. In the prior art wherein the conveyor systems were made up of elongated, helically shaped, screw-type conveyors, the conveyor was of a substantial weight and, when only supported at each end experienced undesirable sagging proximate its center. With the novel construction of the present invention, wherein a large part of each of the screw conveyors comprise the much lighter weight paddle wheel-type construction, the overall weight of the conveyors is substantially reduced when compared to the prior art, single-piece helical screwtype conveyors. Additionally, since conveyors of the present invention are disposed in a side-by-side relationship, the overall length of the reactor can be substantially reduced from that which would be required if only a single helical type screw conveyor were to be used. In summary, because of the novel design of the conveyor systems of the present invention, undesirable sagging of the conveyors is prevented and, as a result of the twin conveyor design, the length of the reactor can be significantly reduced.

When the waste material reaches the second end 34b of the reactor, the pyrolyzed waste will be introduced via extensions 156a into a pair of side-by-side outlet conduits generally designated in FIG. 4 by the numeral 156 where the pyrolyzed waste products can be recovered. Extensions 156a are in communication with the chambers that house the conveyor means so that the waste carried by the conveyor means will be introduced into outlet conduits 156 in the manner indicated by the arrow 160 of FIG. 2A.

As previously mentioned, the heated gases produced by the pyrolytic reactor will be transferred to the thermal oxidizer 26 via outlet 44 and conduit 44a. A portion of the heated gases produced by the pyrolysis of the waste material will be returned from the thermal oxidizer to the reactor to sustain the pyrolysis and a portion will be transferred via conduit 86 to the steam generator subsystem 28 via conduit 86. These later heated gases will function to heat the water contained within tubes 89 to convert it to high pressure steam which, in turn, will be used to drive turbine 30. It is important to note that to maintain the desired transfer of the heated gases, the baffle assembly 56 is strategically operated so as to continuously create a slight positive pressure within first stage 50. This positive pressure will urge a portion of the heated gases to be return to the reactor via conduit 78 to sustain the pyrolysis of the waste. To accomplish this strategic balance, the pressure differential between chambers 50 and 52 is continuously monitored by a differential pressure gauge and the position of the baffle assembly is precisely regulated by a baffle operating means shown in the drawings as comprising a control mechanism 163.

Figure 11:
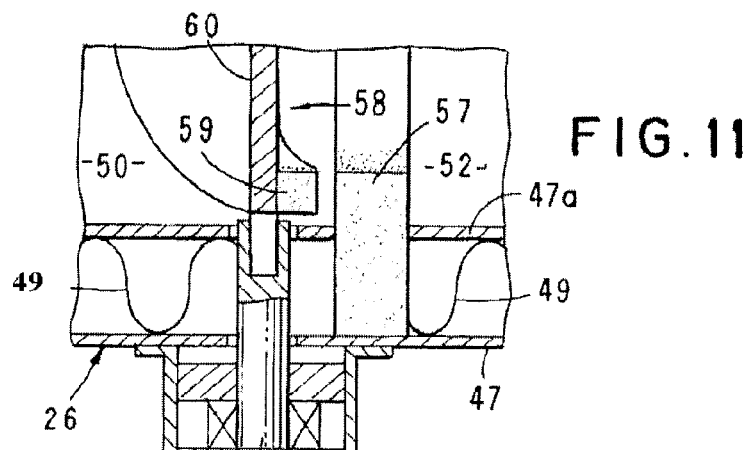
FIG. 11 is a cross-sectional view taken along lines 11-11 of FIG. 10.

As best seen in FIGS. 10, 11, and 12, the unique baffle assembly of the present invention comprises a generally circular-shaped ceramic plate 60 to which a pair of semicircular barrier rings 59 are affixed in the manner illustrated in FIG. 12. The baffle assembly, which comprises plate 60 and the semicircular rings affixed to either side of the plate is mounted for pivotal movement within the thermal oxidizer about an axis 159 that is defined by a pair of spaced-apart pivot pins 161. Pivot pins 161 are mounted within the wall of the thermal oxidizer housing in the manner shown in FIG. 12 so that the baffle assembly can be pivoted about axis 159 by the control mechanism 163 from a first closed position to a second open position. As best seen in FIG. 10, the control mechanism here comprises a drive motor 165 having a drive shaft 165a that drives a toothed gear 167 that is drivably connected to upper pivot pin 161. As is schematically shown in FIG. 14, the differential pressure gauge 169 is in communication with both of the chambers 50 and 52 so that the pressure within the chambers can be continuously monitored. The differential pressure gauge is readily commercially available from several sources. However a gauge sold under the name and style MAGNEHELIC by Dwyer Instruments, Inc. of Anaheim, Calif. has proven satisfactory for the present purpose. In a manner well understood by those skilled in the art, gauge 169 is operably associated with drive motor 165 to appropriately operate the motor to open and close the baffle assembly in a manner to continuously maintain the desired pressure differential between chambers 50 and 52. As previously mentioned, when the pressure differential is properly controlled, the heated gases within chamber 50 will controllably flow into the thermal converter 24 to maintain the pyrolysis of the waste. Accordingly, during normal operation, no heat need be added to the system by the gas fired burners 66 and only a pilot flame need be maintained.

Figure 16:
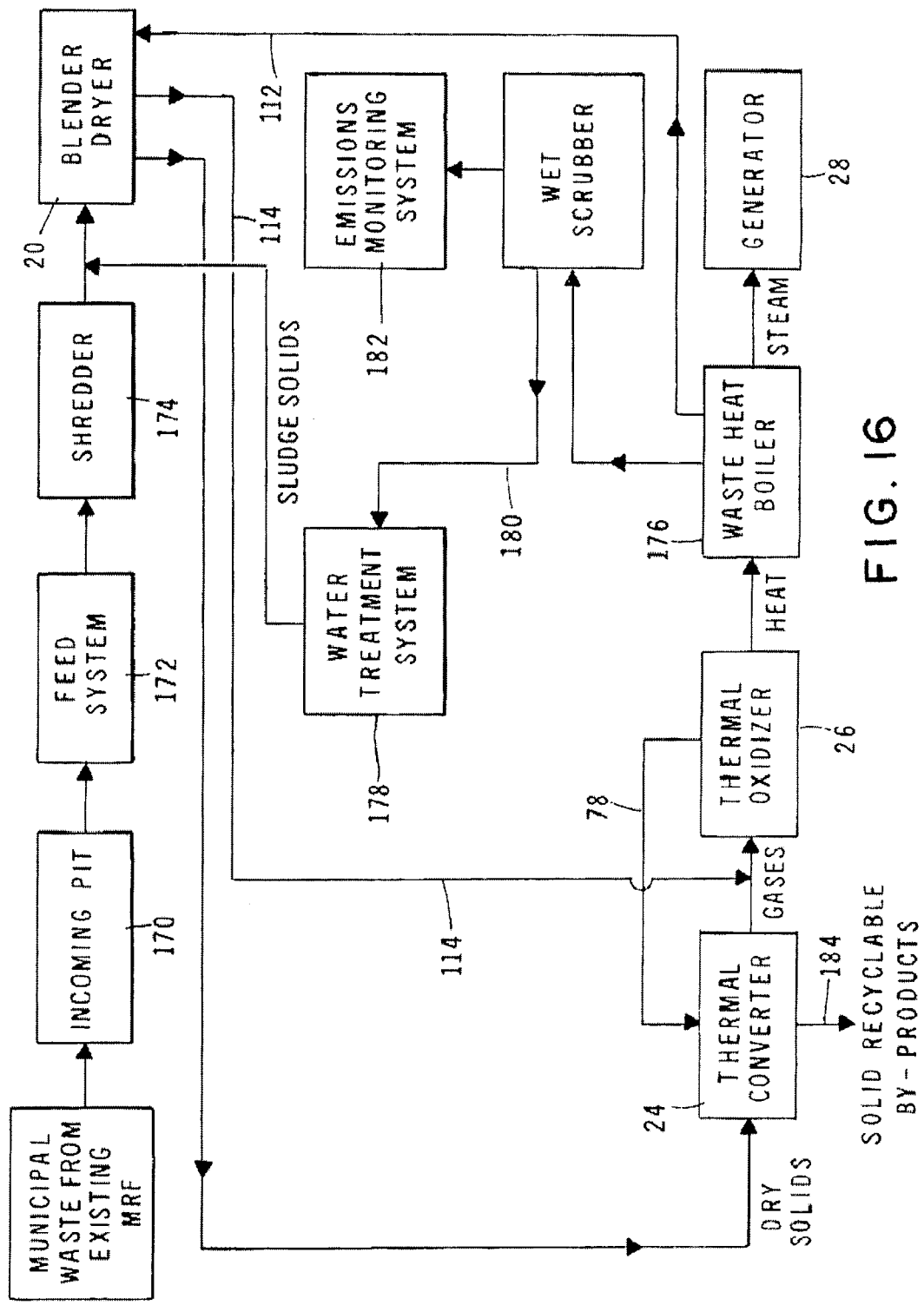
FIG. 16 is a block diagram illustrating the operation of the apparatus of the invention.

By way of summary, during the operational cycle, as illustrated in FIG. 16, the municipal waste to be treated is deposited in an incoming pit 170. From there the waste is transferred by means of a feed system 172 to a conventional shredder 174 which shreds the waste prior to its introduction into the previously identified dryer 20. From the dryer, the dried waste is introduced into the thermal converter 24 via the previously discussed feed means 22. Heated gases generated in the thermal converter are transferred to the thermal oxidizer 26 in the manner previously discussed. As shown in FIG. 16, a portion of the heated gases contained within the thermal oxidizer is returned to the thermal converter via conduit 78. Another portion of the heated gases within the thermal oxidizer is transferred to the waste-heat boiler which forms a part of the previously identified steam generator 28. As depicted in FIG. 16, the heat from the waste-heat boiler is transferred to the blender-dryer by conduit 112 to accelerate the drying process. In turn, the excess gases from the blender-dryer are returned to the thermal oxidizer via conduit 114. A portion of the excess heated gases within the waste-heat boiler 176 are transferred to the wet scrubber and, in the manner previously described, fluids from the wet scrubber are transferred to the water treatment system 178 via a conduit 180. Similarly, gaseous emissions from the wet scrubber are transferred to an admissions monitoring system 182 to ensure that harmful emissions are not emitted into the atmosphere. As indicated by the arrow 184, solid recyclable byproducts are recovered from the thermal converter 24 for appropriate recycling.

Figure 17:
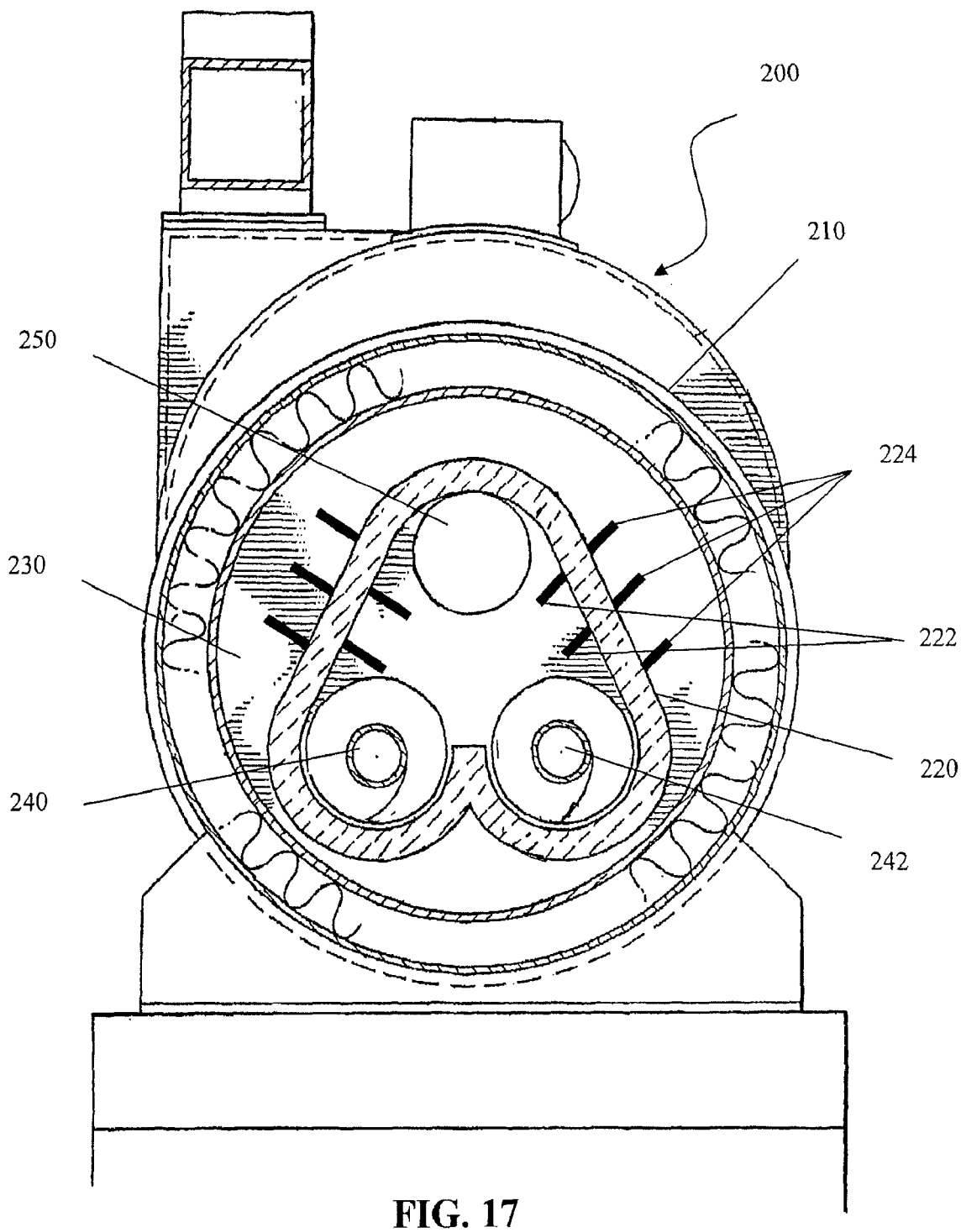
FIG. 17 is a vertical cross-section of a pyrolyzer that includes first and second conveyors, and heat transfer fins.

FIG. 17 generally depicts a pyrolyzer 200 having an outer housing 210, an inner housing 220, a heated space 230 between the inner and outer housings, first and second conveyor mechanisms 240, 242, which preferably carry waste streams independently of one another, and a chamber outlet 250 for transporting pyrolysis exhaust gases out of the inner housing.

The inner housing 220 has both inner and outer heat conduction fins 222, 224, respectively. The fins 222, 224 can be mounted on the inner housing 220 in any suitable manner, including for example, casting or welding. Fins 222, 224 can have any suitable number, dimensions, and orientations, including especially a number of six to ten, a thickness of 2 to 4 cm, a height of 5 to 10 cm, and a length of 10 cm to several meters. Fins are preferably parallel to one another, and parallel to the long axis of the inner housing 220, but alternative fins 222, 224 could have any other suitable orientation, and for example could be co-linear or non-linear. Fins 222, 224 can be separated by any suitable distance, which would typically be between 20 cm and 1 m.

Figure 18:
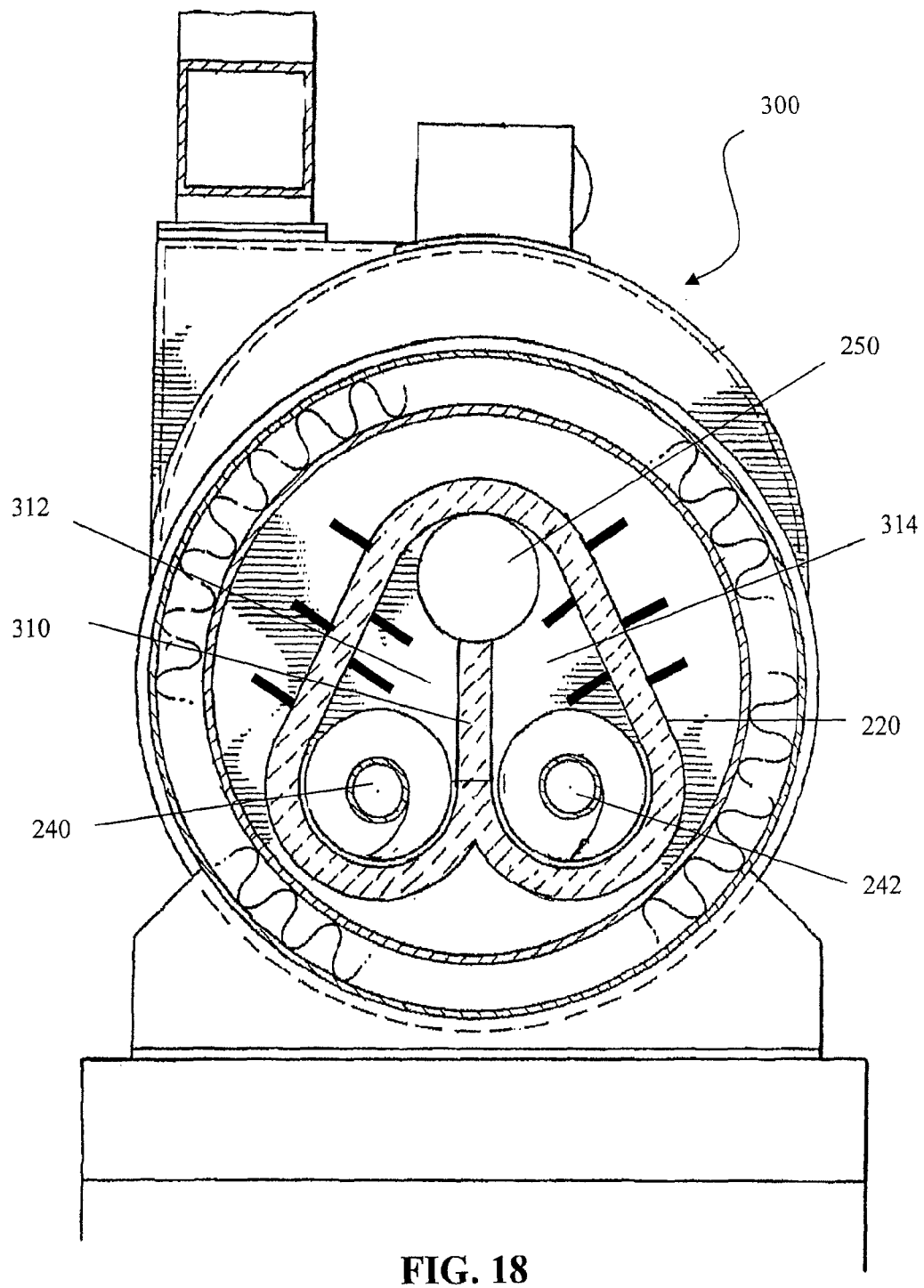
FIG. 18 is a vertical cross-section of an alternative pyrolyzer that includes first and second conveyors, heat transfer fins, and dual lumens.

The pyrolyzer 300 of FIG. 18 is similar to that of FIG. 17 except that there is divider 310 that more or less completely separates the first and second conveyor mechanisms conveyor mechanisms 240, 242. The divider 310 cooperates with the inner wall of inner housing 220 to define first and second lumens 312, 314. The divider 310 can be of any suitable material and dimensions, but typically would be of the same material and thickness as the wall of inner housing 220.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A pyrolyzer, comprising:
    an outer housing;
    a heated inner housing defining an interior cavity that includes first and second conveyors that operate in parallel, and which transport first and second streams of waste material to be pyrolyzed, and wherein the first stream is independent of the second stream; and
    a first plurality of heat conduction fins extending into the interior cavity, and a second plurality of heat conduction fins extending into a heated space between the outer housing and the heated inner chamber for transferring heat into the interior cavity of the heated inner housing.

2. The pyrolyzer of claim 1, wherein the first conveyor is a helical screw conveyor.

3. The pyrolyzer of claim 1, further comprising a divider disposed between the first and second conveyors.

4. The pyrolyzer of claim 3, wherein the divider only partially separates the conveyors.

5. The pyrolyzer of claim 3, wherein the divider is continuous with an interior surface of the heated inner housing.

6. The pyrolyzer of claim 3, wherein the divider is sized and dimensioned to provide structural support to the pyrolyzer.

7. The pyrolyzer of claim 1, wherein the first conveyor is disposed with a first sub-chamber of the heated inner housing, and wherein the second conveyor is disposed with a second sub-chamber of the heated inner housing.

8. The pyrolyzer of claim 1, wherein at least one of the heat conduction fins has a thickness of at least 2 cm.

9. The pyrolyzer of claim 1, wherein at least one of the heat conduction fins has a thickness of at least 4 cm.

10. The pyrolyzer of claim 1, wherein the first conveyor has a helical screw section and a paddle conveyor section.

* * * * *